United States Patent
Stahlberg et al.

(10) Patent No.: US 11,068,594 B2
(45) Date of Patent: Jul. 20, 2021

(54) THREAT DETECTION SYSTEM

(71) Applicant: F-Secure Corporation, Helsinki (FI)

(72) Inventors: Mika Stahlberg, Kauniainen (FI); Matti Aksela, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 346 days.

(21) Appl. No.: 16/174,403

(22) Filed: Oct. 30, 2018

(65) Prior Publication Data

US 2019/0138724 A1    May 9, 2019

(30) Foreign Application Priority Data

Nov. 6, 2017    (GB) .................................... 1718313

(51) Int. Cl.
*G06F 21/56* (2013.01)
*G06F 21/55* (2013.01)

(52) U.S. Cl.
CPC .......... *G06F 21/566* (2013.01); *G06F 21/554* (2013.01); *G06F 2221/034* (2013.01)

(58) Field of Classification Search
CPC .............................. G06F 21/554; G06F 21/566
See application file for complete search history.

(56) References Cited

U.S. PATENT DOCUMENTS

| | | | |
|---|---|---|---|
| 9,152,790 B1* | 10/2015 | Glick | G06F 21/554 |
| 2009/0100520 A1* | 4/2009 | Reasor | G06F 21/566 726/23 |
| 2015/0067845 A1* | 3/2015 | Chari | G06F 21/554 726/23 |
| 2017/0353481 A1* | 12/2017 | Kong | H04L 63/145 |

FOREIGN PATENT DOCUMENTS

WO    WO 2017/213400 A1    12/2017

* cited by examiner

*Primary Examiner* — Ponnoreay Pich
(74) *Attorney, Agent, or Firm* — Harrington & Smith

(57) ABSTRACT

There is provided a method of detecting a threat against a computer system. The method comprises: creating a modular representation of behavior of known applications on the basis of sub-components of a set of known applications; entering the modular representation to an evolutionary analysis system for generating previously unknown combinations of the procedures; storing the generated previously unknown combinations as candidate descendants of known applications to a future threat candidate database; monitoring the behavior of the computer system to detect one or more procedures matching the behavior of a stored candidate descendant in the future threat candidate database; and upon detection of one or more procedures matching the behavior of the stored candidate descendant and if the stored candidate descendant is determined to be malicious or suspicious, identifying the running application as malicious or suspicious.

21 Claims, 3 Drawing Sheets

THREAT DETECTION SYSTEM

FIELD OF THE INVENTION

The present invention relates to the detection of malware on a computer system.

BACKGROUND

The term "malware" is short for malicious software and is used to refer to any software designed to infiltrate or damage a computer system without the owner's informed consent.

Malware can include viruses, worms, Trojan horses, rootkits, adware, spyware and any other malicious and unwanted software. Many computer devices, such as desktop personal computers (PCs), laptops, personal data assistants (PDAs) and mobile phones can be at risk from malware. Computer systems running the Windows™ operating system are particularly at risk from malware, but all operating systems will be at some risk. Examples of other operating systems that could be at risk are Mac OS™, Linux™, Android™ and iOS™.

Traditional malware and threat detection relies on having seen malware samples and having analysed them. As current malware analysis relies on malware already existing and intrusion detection on identifying known patterns, methods allowing analysis of malware that does not yet exist and prediction of their behaviour are needed. It would be very beneficial to see ahead what types of malware will occur in the future and thus be ready to provide protection against them even before the malware exists.

SUMMARY

In an example aspect of the invention, there is an apparatus, such as a computer system apparatus, comprising: at least one processor; and at least one memory including computer program code, where the at least one memory and the computer program code are configured, with the at least one processor, to cause the apparatus to at least: detect a threat against a computer system, including creating a modular representation of behavior of known applications on the basis of sub-components of a set of known applications, wherein each sub-component identifies one or more procedures known to be performed by the applications; entering the modular representation to an evolutionary analysis system for generating previously unknown combinations of the procedures; storing the generated previously unknown combinations as candidate descendants of known applications to a future threat candidate database; monitoring the behavior of the computer system to detect one or more procedures matching the behavior of a stored candidate descendant in the future threat candidate database; and upon detection of one or more procedures matching the behavior of the stored candidate descendant and if the stored candidate descendant is determined to be malicious or suspicious, identifying the running application as malicious or suspicious.

In another example aspect of the invention, there is a method comprising: detecting a threat against a computer system, including: creating a modular representation of behavior of known applications on the basis of sub-components of a set of known applications, wherein each sub-component identifies one or more procedures known to be performed by the applications, entering the modular representation to an evolutionary analysis system for generating previously unknown combinations of the procedures, storing the generated previously unknown combinations as candidate descendants of known applications to a future threat candidate database; monitoring the behavior of the computer system to detect one or more procedures matching the behavior of a stored candidate descendant in the future threat candidate database; and upon detection of one or more procedures matching the behavior of the stored candidate descendant and if the stored candidate descendant is determined to be malicious or suspicious, identifying the running application as malicious or suspicious.

A further example embodiment is an apparatus and a method of the previous paragraphs, there is selecting the sub-components of the set of known applications on the basis of one or more of: a previously generated behavioral model, a set of sub-components having similarities with each other, detected previously unknown sub-components, and/or using specifically generated new sub-components, there is analyzing the behavior of the set of known malicious and/or benign applications in a protected environment, and generating, by a feature extraction system, the behavioral model of the analyzed behavior based on output from the protected environment, there is configuring the behavioural model on the basis of one or more of: execution traces, memory contents, register contents, and/or using static code block analysis, wherein each procedure of the one or more procedures known to be performed by the applications is identified by a characteristic action and one or more expected actions, there is using experimentation for generating the previously unknown combinations of the procedures, there is assigning probabilities of occurrence to the generated previously unknown combinations of the sub-components by the evolutionary analysis system, and storing combinations having the highest likelihood of occurrence as candidate descendants of known application 1, wherein said procedures include any one or more of: establishment of a secure session, communication over a secure session, file operations, registry operations, memory operations, network operations, wherein the characteristic and/or expected actions include one or more of: API calls and/or API call parameters made by the running application, information made available to plugins of the running application, actions relating to browser extensions, file access operations performed by the running application, network operations performed by the running application, encrypted communications sent by the running application, error conditions relating to the running application, there is handling the running application by one or more of: terminating a process of the running application, terminating the characteristic action or an action resulting from the characteristic action, removing or otherwise making safe the running application and performing a further malware scan on the application, there is, upon identifying the running application as malicious or suspicious, at least one of: sending from a client computer to a server details of the characteristic action and other actions taken on the client computer, sending from the server to client computer an indication as to whether or not the running application is malicious or suspicious, sending from the server to the client computer instructions for handling the running application, prompting the client computer to kill and/or remove the application, storing information indicating the application, there is utilizing a genetic algorithm for generating the candidate descendants, there is creating new sub-components by mutating the sub-components of the set of known applications, there is using one or more fitness functions of the genetic algorithm for determining whether a candidate descendant is viable for use and storing only the viable candidate descendants in the future threat candidate database based on the results received from the one or more fitness functions, and there is extracting the most likely new candidate descendant from the future threat candidate database, constructing a detection logic based on the consequent steps the candidate descendant takes, and using the constructed detection logic.

DETAILED DESCRIPTION

In order to provide improved detection of malware that is not yet known, a system is proposed which makes use of behaviour profiles generated for a plurality of known malicious and/or benign applications. In various embodiments of the invention, analysis of previously unknown malware and the prediction of its behaviour is enabled. This is all accomplished without actually generating malicious code but rather using evolutionary modelling of malware behaviour. There are some known approaches that may detect similarity of samples on code level and that can detect coexistence of specific components, but these are often dependent on e.g. the ability to unpack runtime packers of the malware. Some embodiments of the proposed approach instead focus on the behaviour of malware and/or intrusions in order to model them to be further "mutated" in an evolutionary manner, for example by using genetic algorithms.

Thus detecting malicious behaviour is enabled also in very early stages of the activity and even before actual malicious actions are taken. For example, having evaluated a certain behavioural pattern to be a potential candidate as an evolution of a known threat, it is possible to block the activities before actual harm-causing steps are performed by them. Thus, the proposed solution is able to detect and prevent malware and/or fileless attacks that have not seen before. The proposed solution has many benefits, such as providing identification/classification instead of merely detection of malware, providing identification of future versions of samples, providing early detection and stopping execution prior to malicious actions, and understanding the lineage of the threat in an automated manner providing significant benefits to threat intelligence through providing detailed information.

Figure 1:
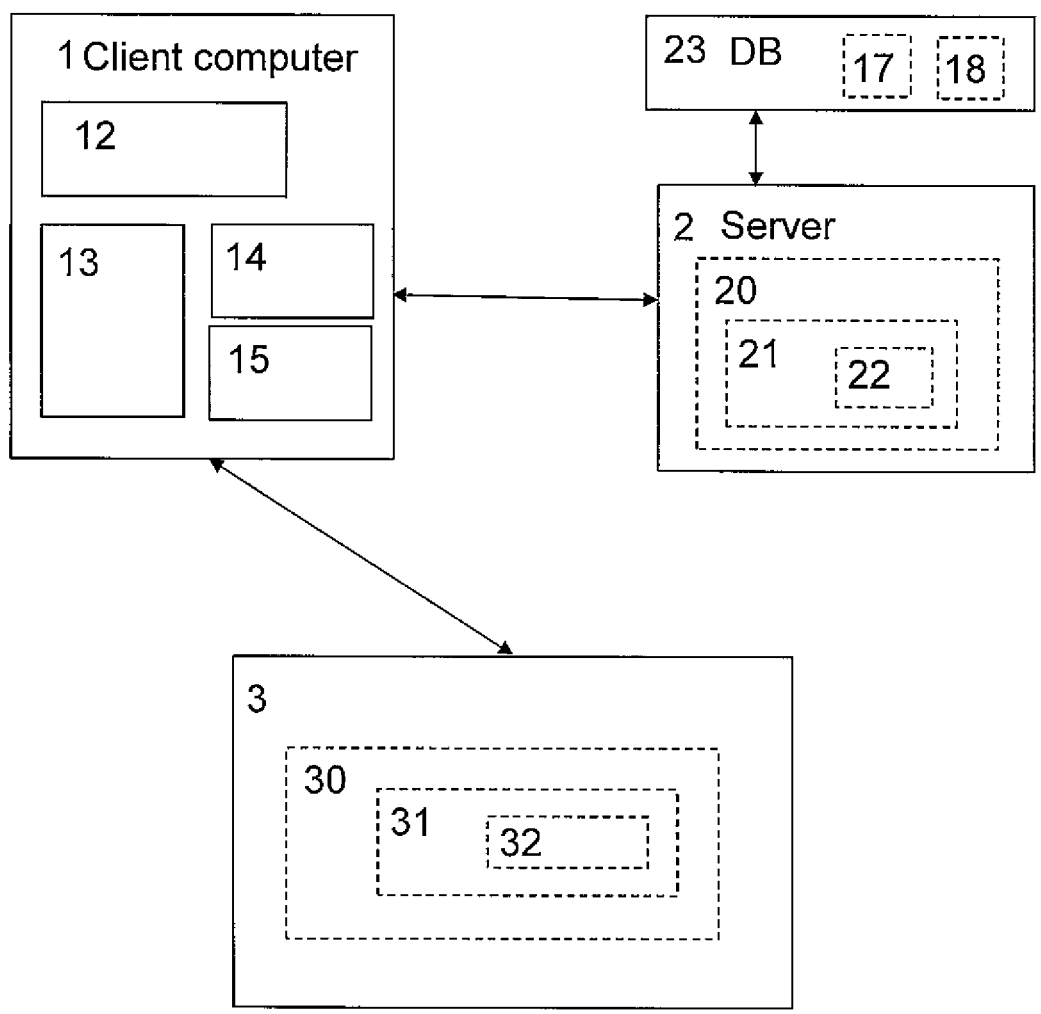
FIG. 1 is a schematic diagram of a system.

An example schematic diagram of a system according to the invention will be described with reference to FIG. 1. A client computer 1 has installed thereon a security application 14 provided by a security service provider. The computer runs a number of further applications, and the security application 14 monitors actions taken by those further applications. The client computer 1 may connect to a server 2, and the security application 14 sends results of the monitoring to the server 2 for analysis, or the analysis may be performed at the client computer 1 by the security application. The behaviour profiles may be constructed at the client 1 by the security application 14, at the server 2, and/or at a second server 3. The client computer 1 and the servers 2 and 3 each typically comprise a hard drive 12, 20, 30, a processor 13, 21, 31, and RAM 15, 22, 32. The client computer 1 may connect to the servers 2 and 3 over the Internet, or any suitable network. The servers 2 and 3 (if used) are operated by the security service provider.

Figure 2:
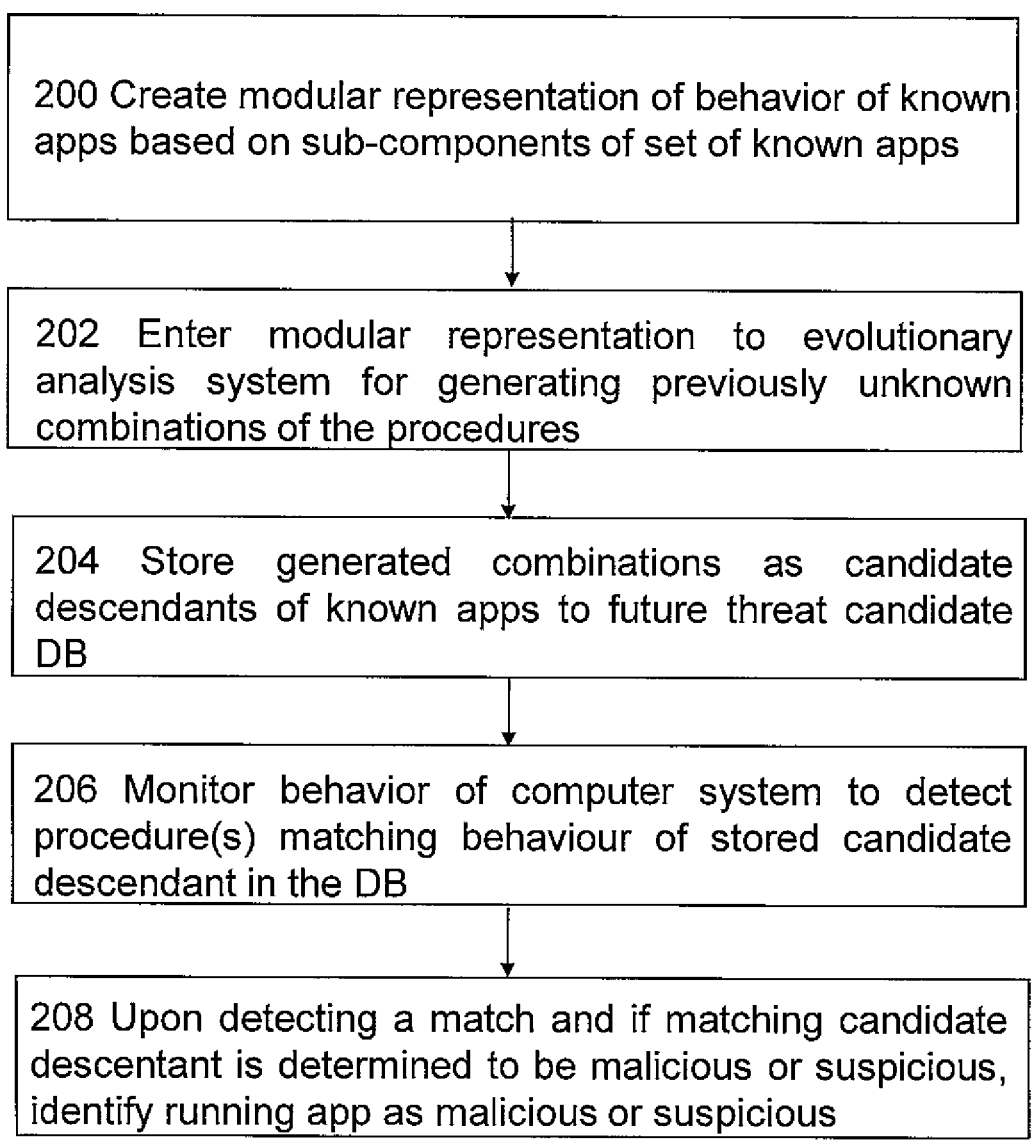
FIG. 2 is a flowchart of a malware protection method according to an embodiment.

FIG. 2 is a flowchart of a method of detecting malware. In 200, the security application creates a modular representation of the behaviour of known malicious and/or benign applications based on sub-components of a set of known applications. Each sub-component identifies one or more procedures known to be performed by the applications. For each such application, the security application may also maintain identification information for the application such as filenames, hash data, certificates, etc. The security application may further maintain a behaviour profile for each of the known applications. The behaviour profile for an application identifies how the application implements one or more procedures, for example how an SSL or other secure connection is established, how the application edits registry entries, or any other operation such as file access, network access or memory related operations. The profile identifies, for each procedure, a characteristic action (which will typically be the action which is the result of the procedure) and one or more expected actions. For example, in the case of an SSL connection, the characteristic action may be the sending of an SSL encrypted message, and the expected actions may include a call to a library which provides an SSL implementation.

As a further example, the characteristic action may be the editing of a registry entry. The API used to perform this action will generally be the same regardless of implementation, but there is a detectable difference in the actions preceding the registry edit depending on the programming language in which the code is written, and possibly on the compiler used. The actions may be anything which is done by the application or other software or hardware on the computer system as part of the procedure. The procedures may include file, registry, memory, and/or network operations.

In an embodiment, the sub-components of the set of known applications may be selected on the basis of one or more of: a previously generated behavioral model, a set of sub-components having similarities with each other, detected previously unknown sub-components, and/or using specifically generated new sub-components. In an embodiment, the behavioural model can be complemented with low-level behaviour such as execution traces, memory and/or register contents and possibly augment this with more static code block analysis that provides structure to the functionality. Thus, the behavioural analysis may be complemented with a static analysis.

In an embodiment, the behavior of the set of known malicious and/or benign applications is first analysed in a protected environment before creating the modular representation. Thus, in an embodiment, a feature extraction system may generate the behavioral model of the analyzed behavior based on output from the protected environment.

In 202, the created modular representation is entered to an evolutionary analysis system for generating previously unknown combinations of the procedures. In an embodiment, experimentation may be used for generating the previously unknown combinations of the procedures. In another embodiment, probabilities of occurrence are assigned to the generated previously unknown combinations of the sub-components by the evolutionary analysis system and combinations having the highest likelihood of occurrence are stored as candidate descendants of known applications.

In an embodiment, a previously generated behavioural model is analysed in a system that is able to find sub-component similarity and cluster the data, essentially creating a representation of the behaviour that is modular and can be fed to at least one evolutionary algorithm of the evolutionary analysis system.

In 204, the generated previously unknown combinations are stored as candidate descendants of known applications 17, 18 to a future threat candidate database 23. In an embodiment, the sample pool of the future threat candidate database evolves and highest likelihood viable candidates may be entered for further analysis and evaluation.

In 206, the behavior of the computer system is monitored to detect one or more procedures matching the behavior of a stored candidate descendant in the future threat candidate database. In an embodiment, protection techniques are generated against the future threat candidates.

In 208, upon detection of one or more procedures matching the behavior of the stored candidate descendant and if the stored candidate descendant is determined to be malicious or suspicious, the running application is identified as malicious or suspicious. The candidate descendants stored in the future threat candidate database are analysed for maliciousness before or after being compared with the behaviours of running applications. In an embodiment, the candidate descendants are predefined as being malicious or suspicious and the running applications are compared only with the procedures matching the behaviour of the candidate descendants that were predefined as malicious or suspicious. In another embodiment, the behaviour of the running application is compared with the behaviours of all candidate descendants and if a matching candidate descendant is found, then a security analysis for maliciousness is executed for determining whether the matching candidate descendant is malicious or suspicious.

Figure 3:
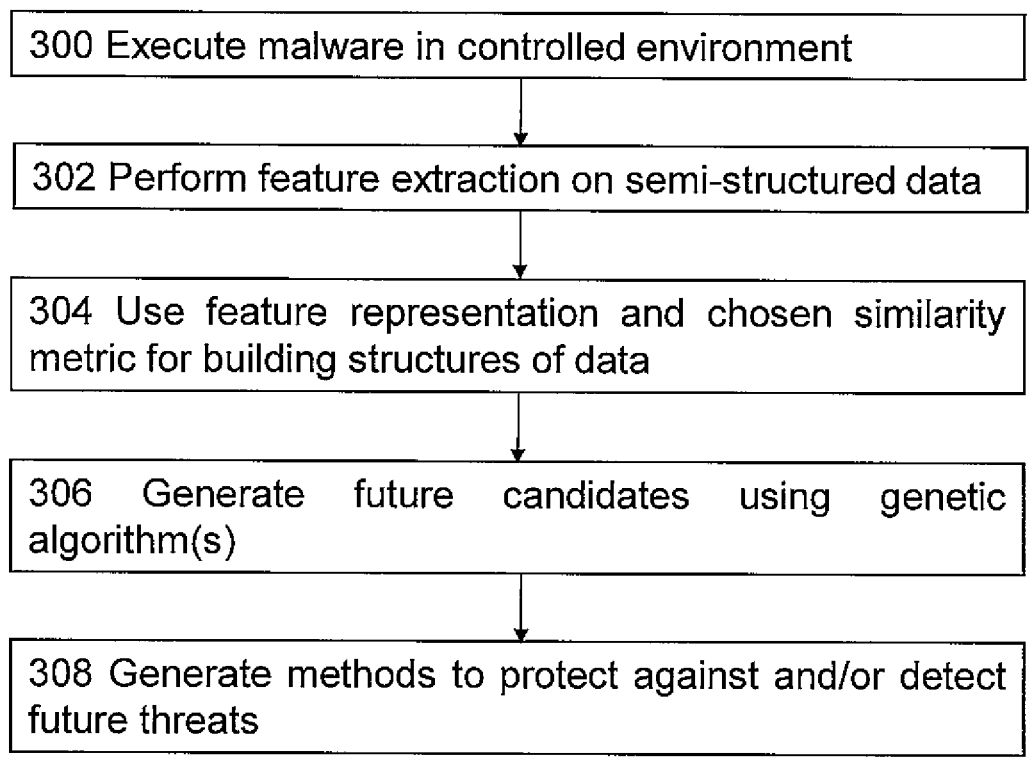
FIG. 3 is a flowchart of another example of a malware protection method.

FIG. 3 is a flowchart of another example of a method according to the invention.

In 300, malware is executed in a controlled environment. Number of measurements may be performed at each step identifying things such as file access, processes started, executables, etc. This may be a raw format limited structure data such as a very detailed sandbox report with additional inputs from network detection sensors monitoring activities initiated by attackers, for example.

In 302 feature extraction is performed on the semi-structured set of data that has been identified in 300. In this context, the features are required for enabling the use of evolutionary method steps: a suitable data structure is needed for the analysis. In an example, some similarity metrics between data blocks are computed. These blocks may represent certain steps a malware takes and thus finding similar steps, such as starting to encrypt drive for ransomware, may be expected to be found elsewhere also. As a result, an activity abstraction representation of the activities the malware takes may be generated, for example.

In 304 further "families" or hierarchies of steps the methods complete are detected based on the feature representation and chosen similarity metrics, for example. Further, stereotypical structures and orderings between the components, for example a functional block first writing something for ensuring that on next restart something specific would happen and/or a block that instigates the restart and/or a block that does encryption, may be built. In an embodiment, building a highly hierarchical model related to this is enabled, the model comprising a combination of the sequential steps following one another (or some in parallel) as happens in real applications. Thus, by first finding the structure in the data, a representation where the combinations of certain types of actions have probabilities of occurrence within a certain context of prior (and/or consequent) actions may be build and then be fed into the next step.

In 306, after having detected the abstracted behavioural representation, a suitable genetic algorithm may be utilised for the generated candidates. In an embodiment, also possible links to actual code blocks may be included in the method. In an embodiment, as much information as is possible is used for generating structural and behavioural models. In an embodiment, a "gene pool" of candidates is continuously evolved by including both existing samples as well as injected "mutations" into the abstracted pool and each descendant's likelihood may be estimated based on the probabilities extracted in the previous stage. As in real nature, it is not uncommon that malware families copy features or even code from each other and/or use released exploit code or such, thus causing "cross pollination" between malware families as well and not just within a family. Thus, in an embodiment the method may use an algorithm intended to simulate the processes that happen in nature where something changes just a bit and then if that change actually generates something viable (even though it has not been seen before) and the change could survive, then this new combination can be stored as a candidate descendant to the future threat candidate database and be used to detect future malware that has not been seen before.

In 308, security methods for detecting and/or protecting against the future threats are generated on the basis of the outputs from the genetic algorithm(s) that has been used. This enables protecting computer systems against malware threats that have not been seen before even before actual attacks against any systems take place. Thus, methods for detecting the descendants of known threats are generated and methods that can be used to protect against and/or detect early enough anything that would match the behaviour of the candidate threat are identified. In an embodiment, the potential next generation threats are studied and methods to protect against them are identified. In an embodiment, this can be achieved by first extracting the most likely new sample threats from the generated pool that are not original samples (protection against known samples usually exists already). Then a detection logic based on the consequent steps that the candidate threat would take to reach its process are constructed. Note that there may be also completely harmless steps in between after the mutations and it is the combination of the steps that defines the threat, not any individual step or fingerprint etc. Finally the constructed detection logic is deployed to enable pre-emptive protection against the selected threat.

The embodiments of the invention may use any suitable evolutionary/genetic algorithms and frameworks. The following is one example of a high-level flow for an evolutionary/genetic algorithm that uses a Selection-Crossover-Mutation framework often used to describe genetic algorithms:

a) Selection:
   i) Select the first "parent" for a new "child" threat using a weighted probability of fitness (or the combined likelihood of occurrence in this case),
   ii) Repeat for the second parent (in an embodiment, a further model where there exists different likelihoods of finding the proper "mate" may be introduced also), b) Crossover:
   i) By utilizing similar principles as in genetics, the features of the child are combined, basically in random but following the structural rules of the model that has been created and essentially combining the features of the two parents to make a descendant, c) Mutation:
  i) Select one of the candidates in the present pool in random,
  ii) Introduce (by random) a mutation to a part of the selected candidate from a set of possible mutations (which could include deleting/adding a functional block or changing a functional block to a different one of the same family etc.,
  iii) Return the mutated candidate to the pool, d) Repeat steps a-b-c until a sufficient set of new candidates for forming a new generation is achieved (for example, as many as the previous generation had), e) Pool re-generation:
  i) Evaluate the total conditional probability of the combinations given the current understanding of all the samples from the previous phase,
  ii) Keep track of the generation (for example a factor decreasing the probabilities of later generations may be used in an exponential manner). In an embodiment, the process may be restarted and "bootstrapped" rather than letting the pool go on for extended periods of time.
  iii) In an embodiment, some additional variation may be introduced by altering the probability based on a suitable distribution of likelihood of change (for example using a Gaussian filter or such),
  iv) Evaluate fitness and select the ones to survive, for example 25% of the new pool and 75% of the old pool (a parameter controlling the speed of change in the pool can be predefined and set accordingly). In an embodiment, the pool can also only be grown and then select the ones based on probabilities. In another embodiment, a time-to-live can be added and have at least part of the samples deleted after enough generations have passed.

f) Based on the total conditional probabilities, an ordered list of likely new candidates from this generation is now generated. The list may be passed on to the next step of the flow and repeated to generate a new generation.

The method steps according to the invention may be created on the "back end", i.e. by a security service provider and provided to the security application at the client computer. The feature extraction part may be performed by an automated and/or manual analysis of known malware. A set of characteristic actions relating to suitable procedures, performed by an application, may be specified and the application then analysed to determine characteristic and expected actions. The analysis may also include receiving behavioural monitoring information from each of a plurality of client computers on which the application has been running, and determining the characteristic and expected actions from the aggregated results of the behavioural monitoring.

Alternatively, at least part of the method steps may be performed at the client computer. In order to create the profile of the malware, the application may be run in a sandbox by the security application installed on the client computer, or the behaviour of the application may be monitored during normal use of the computer. In order to mitigate the risks of creating the profile at the client computer, the application may be subject to intensive behavioural analysis techniques while the profile is being created.

As a further alternative, the behaviour profile may be created either at the client computer or the server by examining the binary code of the application. The code is examined to look for characteristic actions of interest, and to determine which expected actions would be associated with those characteristic actions.

Prior to performing any of the above analyses, the application may be identified as a known malware by comparing it to identification information of the malware. For example, the application may be compared to a hash of a known malicious application, or a digital signature of the application may be examined to determine whether it is valid or issued by a trusted source.

The behaviour monitoring and detection of characteristic and expected actions may be performed at the client computer or at the server. Alternatively, the client computer may monitor the behaviour of the suspect application, and send details of monitored actions to a server, along with identification information for the monitored application. The information may be sent periodically, or only when characteristic actions are detected (e.g. detecting an SSL connection may cause the client computer to send details of the behaviour leading up to the SSL connection to the server). The server maintains the database of future malware threats, and detects characteristic actions (if not already detected by the client), and the expected action. The detection is carried out as described above. If the analysis identifies the application running on the client computer as malicious or suspicious, then the server notifies the client computer, and may specify a response to be performed.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of detecting a threat against a computer system, the method comprising:
  a) creating a modular representation of behavior of known applications on the basis of sub-components of a set of known applications, wherein each sub-component identifies one or more procedures known to be performed by the applications;
  b) entering the modular representation to an evolutionary analysis system for generating previously unknown combinations of the one or more procedures;
  c) storing the generated previously unknown combinations as candidate descendants of known applications to a future threat candidate database;
  d) monitoring the behavior of the computer system to detect one or more procedures matching the behavior of a stored candidate descendant in the future threat candidate database; and
  e) upon detection of the one or more procedures matching the behavior of the stored candidate descendant and if the stored candidate descendant is determined to be malicious or suspicious, identifying a running application as malicious or suspicious.

2. The method according to claim 1, the method further comprising selecting the sub-components of the set of known applications on the basis of one or more of: a previously generated behavioral model, a set of sub-components having similarities with each other, detected previously unknown sub-components, and/or using specifically generated new sub-components.

3. The method according to claim 2, the method further comprising:
analyzing the behavior of the set of known malicious and/or benign applications in a protected environment; and
generating, by a feature extraction system, the behavioral model of the analyzed behavior based on output from the protected environment.

4. The method according to claim 2, the method further comprising configuring the behavioural model on the basis of one or more of: execution traces, memory contents, register contents, and/or using static code block analysis.

5. The method according to claim 1, wherein each procedure of the one or more procedures known to be performed by the applications is identified by a characteristic action and one or more expected actions.

6. The method according to claim 1, further comprising using experimentation for generating the previously unknown combinations of the one or more procedures.

7. The method according to claim 1, the method further comprising assigning probabilities of occurrence to the generated previously unknown combinations of the sub-components by the evolutionary analysis system, and storing combinations having the highest likelihood of occurrence as candidate descendants of known applications.

8. The method according to claim 1, wherein said one or more procedures include any one or more of: establishment of a secure session, communication over a secure session, file operations, registry operations, memory operations, network operations.

9. The method according to claim 5, wherein the characteristic and/or expected actions include one or more of: API calls and/or API call parameters made by the running application, information made available to plugins of the running application, actions relating to browser extensions, file access operations performed by the running application, network operations performed by the running application, encrypted communications sent by the running application, error conditions relating to the running application.

10. The method according to claim 1, further comprising handling the running application by one or more of: terminating a process of the running application, terminating the characteristic action or an action resulting from the characteristic action, removing or otherwise making safe the running application and performing a further malware scan on the application.

11. The method according to claim 1, upon identifying the running application as malicious or suspicious, further comprising at least one of: sending from a client computer to a server details of the characteristic action and other actions taken on the client computer;
sending from the server to client computer an indication as to whether or not the running application is malicious or suspicious; sending from the server to the client computer instructions for handling the running application; prompting the client computer to kill and/or remove the application; storing information indicating the application.

12. The method according to claim 1, further comprising, at step c), utilizing a genetic algorithm for generating the candidate descendants.

13. The method according to claim 12, further comprising creating new sub-components by mutating the sub-components of the set of known applications.

14. The method according to claim 12, the method further comprising using one or more fitness functions of the genetic algorithm for determining whether a candidate descendant is viable for use and storing only the viable candidate descendants in the future threat candidate database based on the results received from the one or more fitness functions.

15. The method according to claim 1, further comprising extracting the most likely new candidate descendant from the future threat candidate database; constructing a detection logic based on the consequent steps the candidate descendant takes; and using the constructed detection logic at step e).

16. A non-transitory computer storage medium having stored thereon computer program code for implementing the method of claim 1.

17. A computer system comprising:
a memory configured to store computer program code, and
a processor configured to read and execute computer program code stored in the memory,
wherein the processor is configured to cause the computer system to perform:
a) creating a modular representation of behavior of known applications on the basis of sub-components of a set of known applications, wherein each sub-component identifies one or more procedures known to be performed by the applications;
b) entering the modular representation to an evolutionary analysis system for generating previously unknown combinations of the one or more procedures;
c) storing the generated previously unknown combinations as candidate descendants of known applications to a future threat candidate database;
d) monitoring the behavior of the computer system to detect one or more procedures matching the behavior of a stored candidate descendant in the future threat candidate database; and
e) upon detection of the one or more procedures matching the behavior of the stored candidate descendant and if the stored candidate descendant is determined to be malicious or suspicious, identifying a running application as malicious or suspicious.

18. The system according to claim 17, wherein the processor is further configured to cause system to perform:
selecting the sub-components of the set of known applications on the basis of one or more of: a previously generated behavioral model, a set of sub-components having similarities with each other, detected previously unknown sub-components, and/or using specifically generated new sub-components.

19. The system according to claim 18, wherein the processor is further configured to cause the system to perform:
analyzing the behavior of the set of known malicious and/or benign applications in a protected environment; and
generating, by a feature extraction system, the behavioral model of the analyzed behavior based on output from the protected environment.

20. The system according to claim 17, wherein the processor is further configured to cause the system to perform assigning probabilities of occurrence to the generated previously unknown combinations of the sub-components by the evolutionary analysis system, and storing combinations having the highest likelihood of occurrence as candidate descendants of known applications.

21. The system according to claim 17, wherein the processor is further configured to cause the system to perform handling the running application by one or more of: terminating a process of the running application, terminating the characteristic action or an action resulting from the characteristic action, removing or otherwise making safe the running application and performing a further malware scan on the application.

* * * * *